UNITED STATES PATENT OFFICE.

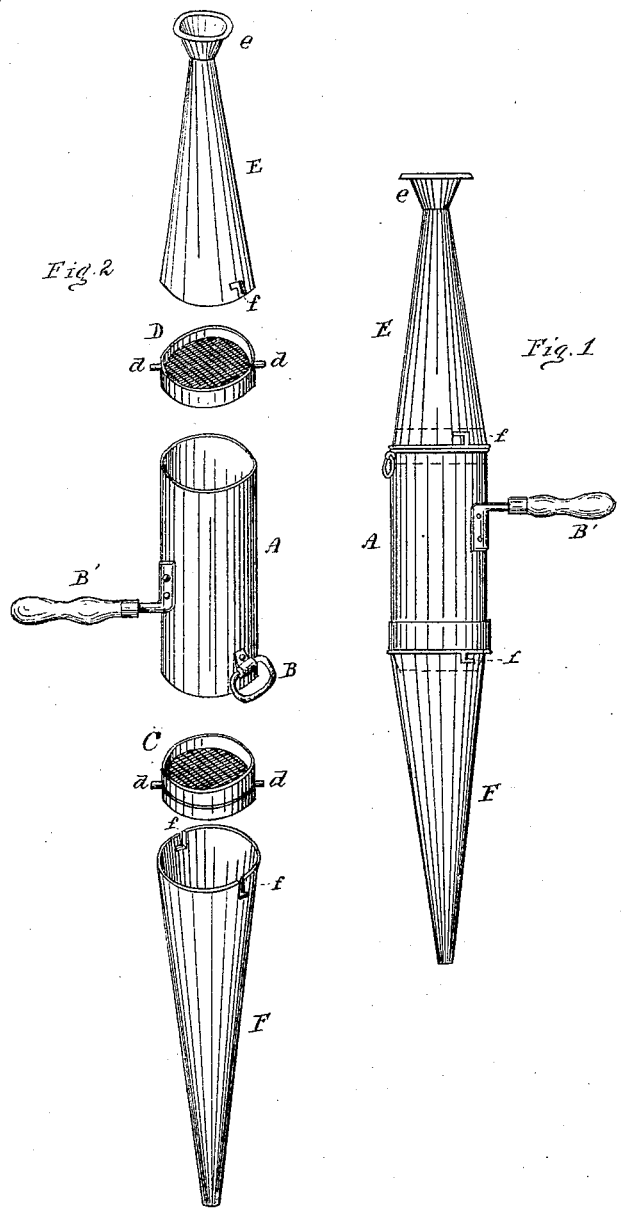

ABRAHAM R. DENLINGER, OF GORDONVILLE, PENNSYLVANIA.

IMPROVEMENT IN FUMIGATORS.

Specification forming part of Letters Patent No. 144,962, dated November 25, 1873; application filed August 30, 1873.

*To all whom it may concern:*

Be it known that I, ABRAHAM R. DENLINGER, of Gordonville, in the county of Lancaster and State of Pennsylvania, have invented additional Improvements on a Fumigator, for which Letters Patent were granted June 17, 1873, No. 139,881, of which the following is a specification:

The object of the improvement is to give the fumigator a wider range of usefulness, and to disconnect the perforated diaphragms for the purpose of changing or cleaning the same, which changes may be construed as differing substantially from the patent referred to, and, as such, constitute an improvement.

In the accompanying drawings, Figure 1 shows the fumigator with its parts combined. Fig. 2 is a perspective view, showing the several parts detached.

A is a metallic cylinder of any desired size, open at both ends, and provided with a ring or handle, B B', or both. The diaphragms C D are made similar to a round sieve—that is, there is a flange or rim on each side that fits into or over the adjoining piece. Fig. 1 shows the upper tapering tube E with its mouth-piece e. The lower or wide end receives the upper rim of the diaphragm D, which has pins d on opposite sides, that enter a slot with a catch, f, in E, by which it is held. The lower rim of D fits into the upper portion of the cylinder A. The lower diaphragm C is shown to receive into its upper flange or rim the lower end of cylinder A, and the conic tube F, with its lock-catches f, receives the lower rim of said diaphragm and its pins, by which the parts are held combined, and jointly constitute the improved fumigator, whether thus or otherwise attached to each other.

The detachable diaphragms not only admit of being more easily cleaned, but may be exchanged, so that the fumigator can be used for a variety of purposes.

If found too hard upon the lungs, a bellows attachment or forcing-pump, may be used. Change of diaphragms, with one of them differently perforated, for the use of tar and dry hay-blossoms, &c., to fumigate horses, is found highly beneficial in various diseases to which this noble animal is subject. Also, gardeners find it of especial use for expelling the red spider or other noxious insects, or even vermin, by means of sulphur, tobacco, or other combustible compounds. It proves of great success in expelling slaters from brick walls, cockroaches from their crannies, and, in short, is of universal application as a fumigator, and is not simply confined to the use of taming bees. Butchers use it to fumigate their meat, and for smoking meat it has proved highly efficient.

In my former patent I claim the cylinder A and top and bottom tubes, with the perforated diaphragms.

What I now claim is—

In combination with the cylinder A and conic tubes E F, the detachable rimmed or flanged and perforated diaphragms D C, locked or otherwise attached, when the whole jointly is constructed substantially in the manner and for the purpose described.

ABRAHAM R. DENLINGER.

Witnesses:
WM. B. WILEY,
J. STAUFFER.